United States Patent [19]

Lockhart

[11] Patent Number: 4,537,548
[45] Date of Patent: Aug. 27, 1985

[54] COMBINATION HAY HAULER AND STOCK TRAILER

[76] Inventor: Billy J. Lockhart, c/o M and A Petroleum, Inc., P.O. Box 89, Lampasas, Tex. 76550

[21] Appl. No.: 560,242

[22] Filed: Dec. 12, 1983

[51] Int. Cl.³ .............................................. A01D 90/02
[52] U.S. Cl. ..................... 414/24.5; 414/111; 414/459
[58] Field of Search ............ 414/24.5, 24.6, 458, 414/459, 460, 111

[56] References Cited

U.S. PATENT DOCUMENTS

| 2,982,430 | 5/1961 | Clifton | 414/459 |
|---|---|---|---|
| 4,204,790 | 5/1980 | Baxter | 414/24.5 |
| 4,232,986 | 11/1980 | Johnson | 414/24.5 |
| 4,248,560 | 2/1981 | Roose | 414/24.5 |

FOREIGN PATENT DOCUMENTS 2496397  6/1982  France ................. 414/111

*Primary Examiner*—Joseph E. Valenza
*Assistant Examiner*—Janice Krizek
*Attorney, Agent, or Firm*—Neal J. Mosely

[57] ABSTRACT

A multiple use agricultural vehicle is disclosed for collecting and transporting a plurality of hay bales at different levels which includes an auxiliary structure for lifting and transporting livestock. The vehicle includes an elongated mobile frame having laterally spaced side members with upper and lower lifting and supporting members movably mounted thereon and arranged in longitudinally spaced and laterally opposed nesting units. The vehicle includes separate motors for selectively moving the upper lifting and supporting unit between a lowered nested position and a raised load supporting position, and sequentially raising the lower lifting and supporting unit to a load supporting position, or raising the nested upper and lower units simultaneously to a load supporting position. A goose-neck tongue member is pivotally connected at the forward end of the frame to permit pulling of the vehicle by a prime mover in longitudinal alignment and in laterally offset relation.

11 Claims, 9 Drawing Figures

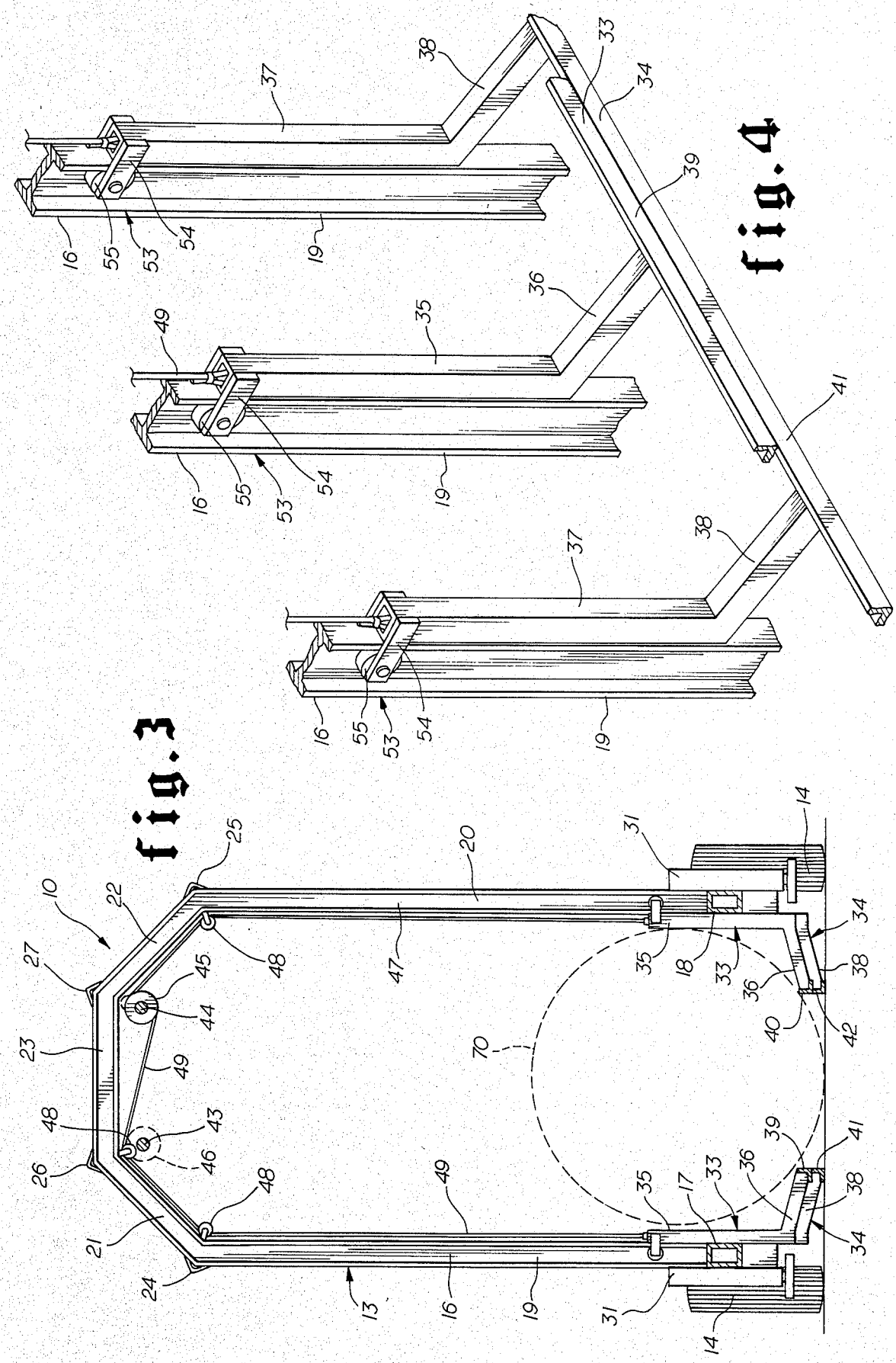

COMBINATION HAY HAULER AND STOCK TRAILER

BACKGROUND OF THE INVENTION

1. Field of the Invention

This invention relates to agricultural vehicles and more particularly to a multiple use agricultural vehicle for collecting and transporting hay bales in multiple levels and alternatively lifting and transporting a livestock cage.

2. Brief Description of the Prior Art

There are several patents which disclose agricultural vehicles designed merely for collecting and transporting a single level of hay bales and make no provision for increasing the utility of the vehicle to perform other agricultural tasks.

Parker, U.S. Pat. No. 4,072,241 discloses an agricultural vehicle having a plurality of cooperative pairs of cylinders for lifting and transporting hay bales.

Love, U.S. Pat. No. 4,227,844 discloses an apparatus having a pair of longitudinal lifting members operated by hydraulic cylinders to lift the hay bales.

Kucera, U.S. Pat. No. 4,076,137 discloses a bale handling device having longitudinal lifting members attached to a frame which moves vertically relative to the wheels of the vehicle when hydraulic cylinders are actuated.

Christenson, U.S. Pat. No. 2,862,635 discloses a straddle carrier having vertically movable load lifting members operated by hydraulic cylinders.

Belding, U.S. Pat. No. 2,706,057 discloses a lift truck having lifting tines connected to rollers or casters disposed in hollow slotted vertical legs. A pair of cables connect the dollies to a hoisting unit comprising a hand crank and pair of reels mounted on a shaft.

The prior art in general, and none of these patents in particular, does not disclose an agricultural vehicle for collecting and transporting hay bales at different levels and equipped alternatively for lifting and transporting a livestock cage.

SUMMARY OF THE INVENTION

It is therefore an object of the present invention to provide an agricultural vehicle operable to collect and transport hay bales at multiple levels.

Another object of this invention is to provide an agricultural vehicle which will lift and support a first level of hay bales while a second level of hay bales is being collected.

Another object of this invention is to provide a multiple use agricultural vehicle which will move over and straddle one or more hay bales and lift them to a plurality of carrying positions.

Another object of this invention is to provide a multiple use agricultural vehicle capable of moving forwardly or rearwardly to straddle a load to be lifted.

Another object of this invention is to provide a multiple use agricultural vehicle having a goose-neck tongue member movable between a position aligned with a prime mover and a position parallel and laterally offset therefrom.

Another object of this invention is to provide a multiple use agricultural vehicle which will move over and straddle a livestock cage and lift it to a carrying position.

Other objects of the invention will become apparent from time to time throughout the specification and claims as hereinafter related.

The above noted objects and other objects of the invention are accomplished by a multiple use agricultural vehicle for collecting and transporting a plurality of hay bales at different levels which includes an auxiliary structure for lifting and transporting livestock. The vehicle includes an elongated mobile frame having laterally spaced side members with upper and lower lifting and supporting members movably mounted thereon and arranged in longitudinally spaced and laterally opposed nesting units. The vehicle includes separate motors for selectively moving the upper lifting and supporting unit between a lowered nested position and a raised load supporting position, and sequentially raising the lower lifting and supporting unit to a load supporting position, or raising the nested upper and lower units simultaneously to a load supporting position. A goose-neck tongue member is pivotally connected at the forward end of the frame to permit pulling of the vehicle by a prime mover in longitudinal alignment and in laterally offset relation.

BRIEF DESCRIPTION OF THE DRAWINGS

FIG. 3 is a cross sectional view taken along lines 3—3 of FIG. 2 and showing the lifting members in the lowered nested position.

FIG. 4 is an enlarged partial isometric view of the lifting members.

DESCRIPTION OF THE PREFERRED EMBODIMENT

Figure 1:
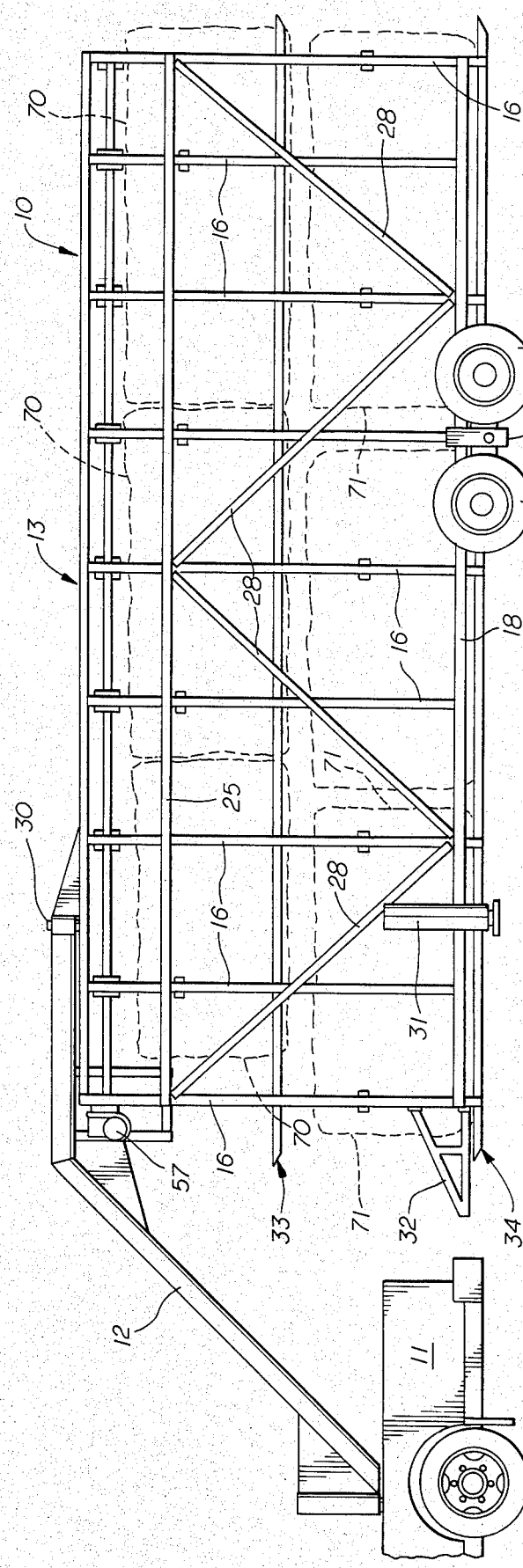
FIG. 1 is a view in side elevation of the multiple use agricultural vehicle shown connected to a prime mover.
Figure 2:
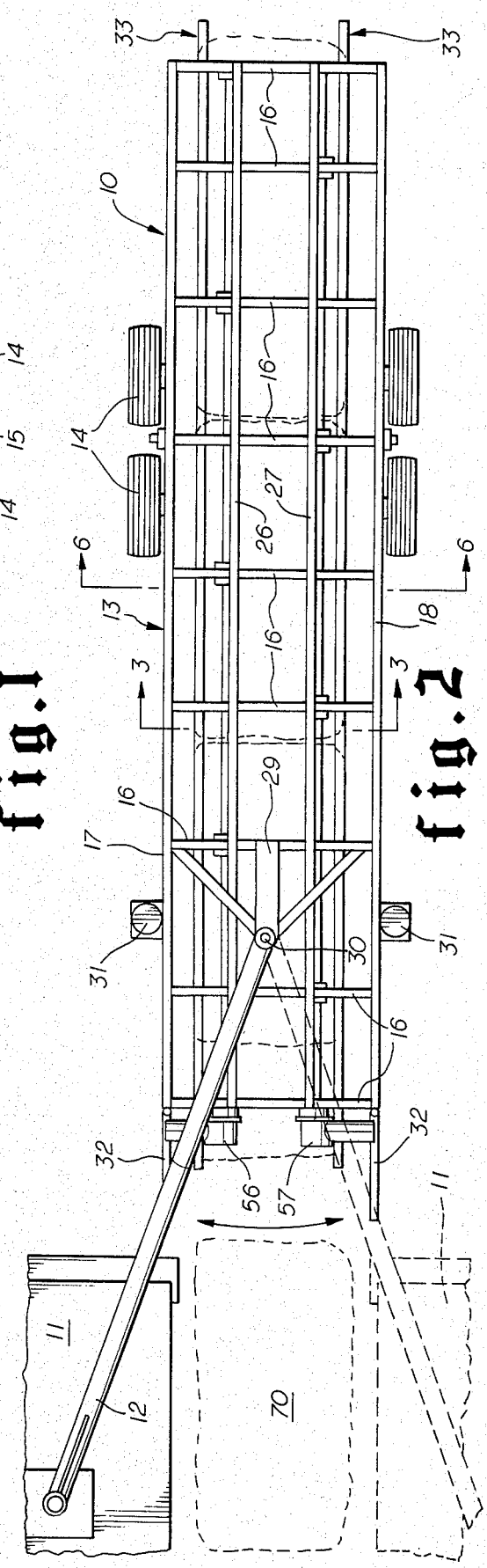
FIG. 2 is a top plan view of the assembly shown in FIG. 1.

Referring to the drawings by numerals of reference, and more particularly to FIGS. 1, 2, and 3, the multipurpose agricultural vehicle 10 is shown connected to a prime mover 11, e.g. truck or tractor, by means of a goose-neck tongue member 12. The vehicle 10 comprises an elongated frame 13 supported on wheels 14 connected thereto by a walking beam type suspension assembly 15.

The frame 13 is an elongated structure open at both ends and through the bottom. A plurality of longitudinally spaced inverted generally U-shaped frame members 16 constructed of structural I-beams are connected at their bottom ends to a pair of longitudinally extending, hollow square tubing side members 17 and 18, one on each side of the frame 13. Each U-shaped member 16 includes first and second leg portions 19 and 20 extending upwardly from the side members 17 and 18. First and second inclined frame members 21 and 22 extend upwardly and inwardly from the leg portions 19 and 20.

A transverse top frame member 23 extends between the upper ends of the inclined frame members 21 and 22.

A pair of longitudinally extending side brace members 24 and 25 attached to the U-shaped members 16 at the outer junction of the leg and inclined frame members, and a similar pair of top brace members 26 and 27 attached at the outer junction of the top and inclined portions, serve to strengthen and reinforce the frame 13. Diagonal cross braces 28 are additionally provided for the same purpose.

The goose-neck tongue member 12 is pivotally connected at one end to a longitudinal frame cross member 29 near the forward end of the frame 13 by means of pivot pin 30. The other end of the tongue member 12 is adapted to be connected to conventional prime movers such as a truck, tractor, or other vehicle. Optional jack members 31 are attached adjacent one or both ends of frame 13 for support and leveling. A pair of angularly shaped ramp members 32 are pivotally connected on laterally opposed sides of the frame 13 to facilitate handling of the hay bales on rough terrain, and may be folded out of the way when not used.

Figure 5:
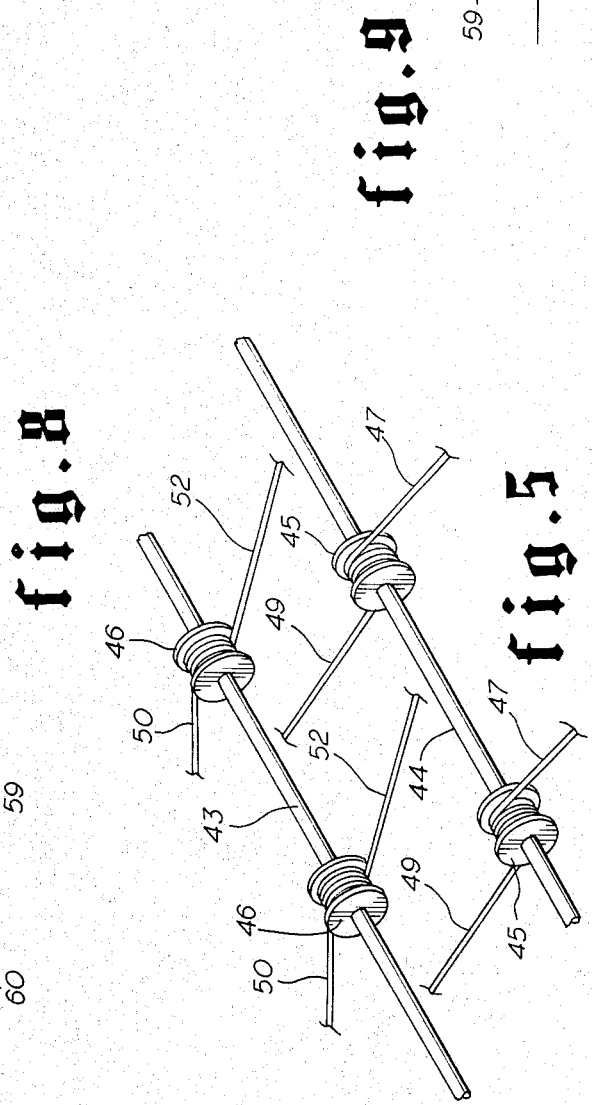
FIG. 5 is an enlarged partial isometric view of the lifting mechanism of the present invention.

Referring now to FIGS. 3, 4, and 5, an upper lifting support assembly 33 and a lower lifting and support assembly 34 are movably mounted on the U-shaped members 16. The upper lifting and support assembly 33 comprises a plurality of vertical members 35 of square tubing having a downwardly and inwardly inclined bottom portion 36. The members 35 are mounted in longitudinally spaced and laterally opposed positions on longitudinally alternating U-shaped frame members 16.

The lower lifting and support assembly 34 is substantially similar to the upper assembly 33 and comprises a plurality of vertical members 37 of square tubing having a downwardly and inwardly inclined bottom portion 38. The members 37 are mounted in longitudinally spaced and laterally opposed positions on longitudinally alternating U-shaped frame members 16 adjacent to members 35.

A pair of longitudinally extending and laterally opposed runners 39 and 40 of angle iron connect the ends of the inclined bottom portions 36 of the upper lifting and support members 35, and a similar pair of runners 41 and 42 of angle iron connect the ends of the inclined bottom portions 38 of the lower lifting and support members 37 to form the unitary and independent upper and lower lifting and support assemblies 33 and 34. When both assemblies are extended to their lowest downward position, the upper assembly 33 nests on the lower assembly 34.

A pair of shafts 43 and 44 are rotatably journaled in brackets (not shown) secured to the frame members 16, and each carries a plurality of reels 45 and 46. Reels 45 cooperate with the upper lift and support 33, while reels 46 cooperate with the lower lift and support assembly 34. A set of short cables 47 extend from reels 45 over pulleys 48 and are secured to the upper ends of vertical members 35. Another set of longer cables 49 extend from the pulleys 48 and are secured to the upper ends of laterally opposed vertical members 35.

Figure 6:
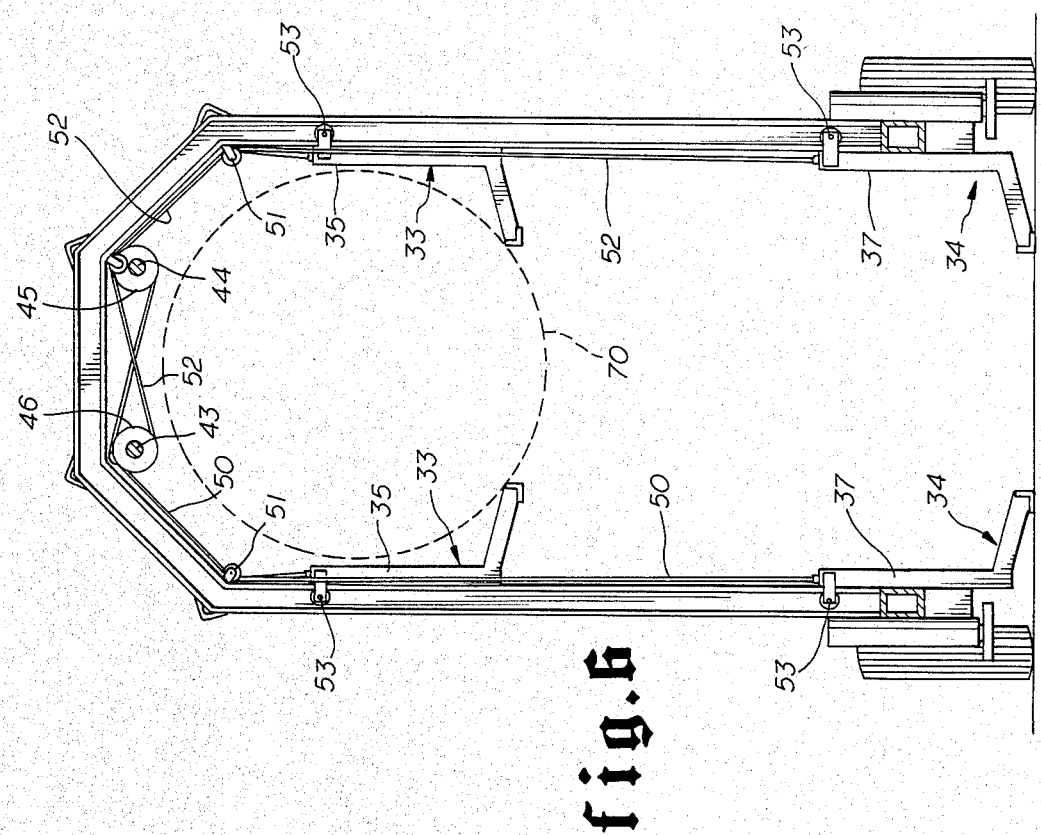
FIG. 6 is a cross sectional view taken along lines 6—6 of FIG. 2 and showing the upper lifting member in the raised load supporting position.

A similar set of short cables 50 extend from reels 46 over pulleys 51 and are secured to the upper ends of vertical members 37. A set of longer cables 52 extend from the reels 46 over pulleys 51 and are secured to the upper ends of the laterally opposed vertical members 37 (FIG. 6).

Guide rollers 53 are attached to the upper ends of vertical members 35 and 37 by brackets 54 (FIG. 4).

The guide rollers comprise a pair of opposed wheels or rollers 55 adapted to roll vertically on opposite sides of the web portion of the vertically extending I-beams of the U-shaped supporting members 16. Guide rollers keep the support members 33 and 34 aligned on their respective I-beams during vertical movement.

The shafts 43 and 44, and reels 45 and 46 are rotated by electric winches 56 and 57 mounted on the frame 13 (FIGS. 1 and 2). Winch 56 operates the upper lift and support assembly 33 and winch 57 operates the lower lift and support assembly 34. Both winches 56 and 57 cooperate to operate the two lifting and support assemblies 33 and 34 simultaneously. Obviously, other motor means, e.g. internal or external combustion engines, hydraulic or pneumatic motors or the like, could be used to power winches 56 and 57.

Figure 8:
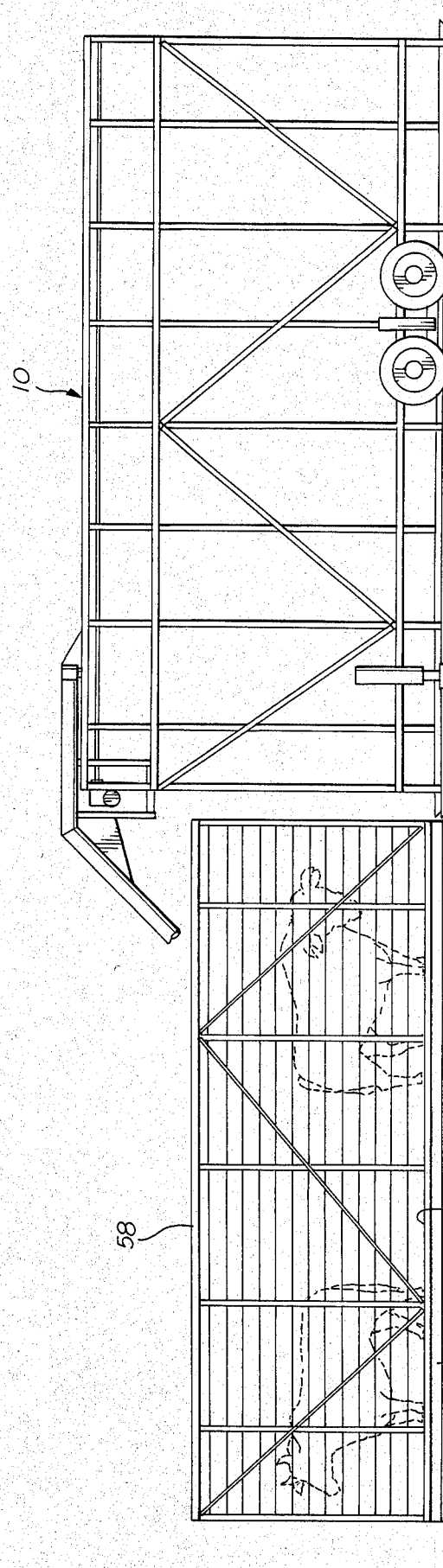
FIG. 8 is a side elevational view of the vehicle in position prior to straddling and lifting a livestock cage.
Figure 9:
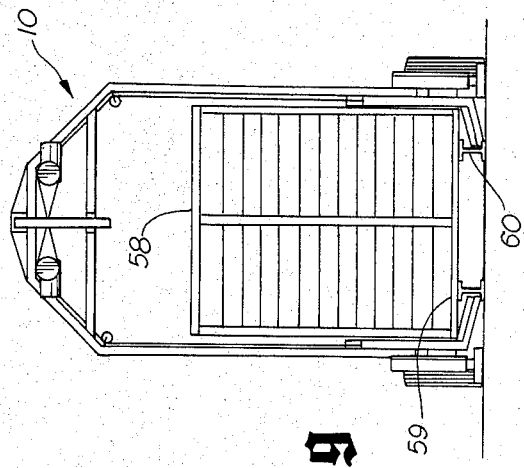
FIG. 9 is a view in front end elevation showing the livestock cage prior to being lifted and supported.

FIGS. 8 and 9 show the vehicle 10 in position prior to straddling and lifting a livestock cage 58. Cage 58 has a conventional frame structure of a width adapted to be received by the vehicle and includes a floor 59 and a base or skid 60. The cage 58 may also include optional lift rails adapted to mate with the runners 39 and 40 and means to secure the cage to the vehicle 10 (not shown).

OPERATION

Referring to FIGS. 1-3, 6, and 7, utilization of the vehicle 10 to load hay bales is accomplished by first fixing the goose-neck tongue 12 in its lateral and parallel offset position from the prime mover 11. The prime mover 11 is driven alongside hay bales 70 (FIG. 2) so that the frame 13 is longitudinally aligned with the axis of the bale, and the open front end is positioned adjacent one end of the bale 70.

The winches 56 and 57 are actuated to lower both the upper and lower lift and support assemblies 33 and 34 (FIG. 3). The prime mover 11 pulls the vehicle 10 forward over and around the bale 70 with the runners 39, 40, 41, and 42 positioned below and on opposite sides thereof. Winches 56 and 57 are then actuated to raise the nested lifting and support assemblies and the bale 70 sufficiently to drive to a second bale, and the procedure is repeated until the length of the frame 13 is filled with a row of hay bales.

Figure 7:
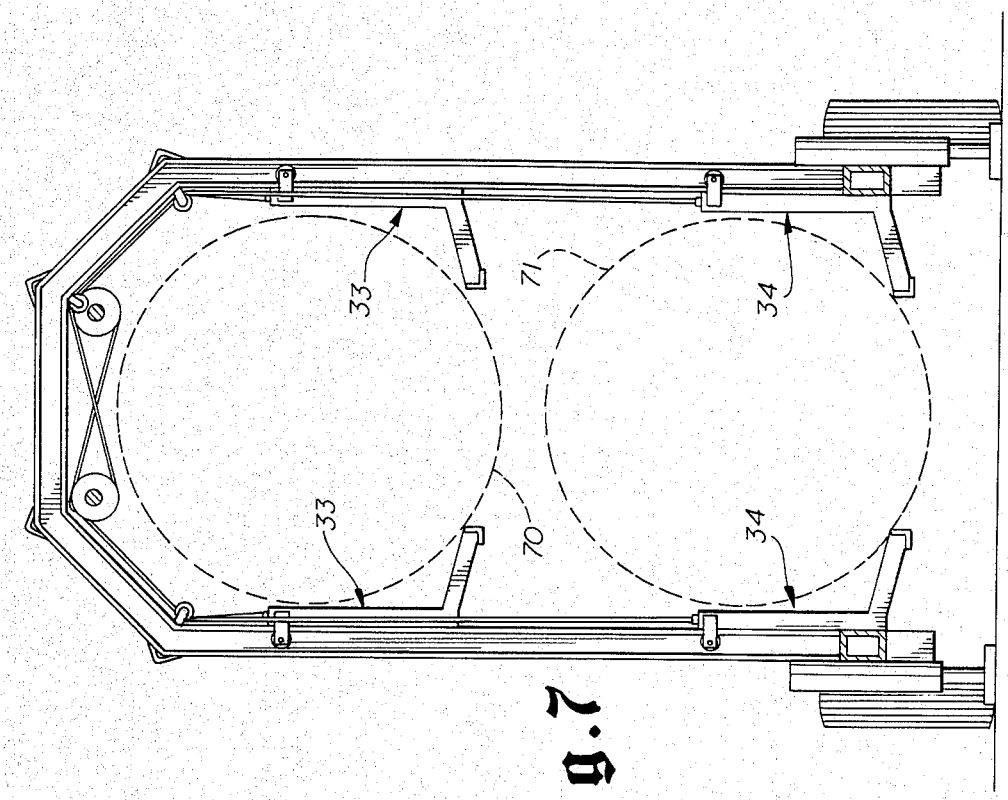
FIG. 7 is a cross sectional view showing the upper and the lower lifting members in the raised load supporting position.

After the frame is filled, the winch 56 is actuated to raise the upper lift and support assembly 33 to its highest load supporting position (FIG. 6). The lower lift and support assembly 34 is then ready to be positioned to collect a lower level of hay bales 71. The loading operation is repeated as previously described utilizing only winch 57 and lower lift and support assembly 34 until the frame is again filled. The winch 57 then lifts the lower level of hay bales 71 to its raised load supporting position and the vehicle is thus filled with two levels of hay bales (FIG. 7). It should be understood that the vehicle 10 may also be backed over the bales to be loaded.

The tongue is then fixed in its forwardly aligned position and the loaded vehicle 10 may be transported to a location for unloading or storage. The jacks 31 may be used to support the frame 13 for removal of the prime mover 11. When unloading, the lower lifting and support assembly 34 is lowered to its bottom position and the bales are deposited on the ground. The vehicle 10 is then pulled forward sufficient to clear the forward bale of the previously deposited bales, and the upper lift and support assembly 33 is lowered to deposit the upper level of bales.

To utilize the vehicle for loading and transporting livestock (FIGS. 8 and 9), the goose-neck tongue 12 is fixed in its lateral and parallel offset position from the prime mover 11. The livestock are simply walked into the cage 58. No ramps are required since the floor 59 of the cage 58 is just slightly above ground level. The prime mover 11 is driven alongside the cage 58 so that the frame 13 is longitudinally aligned with the axis of the cage 58.

The winches 56 and 57 are actuated to lower both the upper and lower lift and support assemblies 33 and 34 to their bottom position. The prime mover 11 pulls the frame 13 forward to straddle the cage 58 with the runners 39, 40, 41, and 42 positioned below and to both sides of the cage. Winches 56 and 57 are then actuated to raise the upper and lower lift and support assemblies 33 and 34 and cage 58 sufficiently to transport the vehicle 10 to a location for unloading or storage. The cage 58 may be conventionally pinned or latched to the frame 13 to further secure the cage against unwanted movement.

To unload the livestock cage 58, both lifting and support assemblies 33 and 34 are lowered to their bottom position and the cage 58 is deposited on the ground. The vehicle 10 is then pulled forward sufficient to clear the cage.

It can thus be seen from the foregoing that the resulting hay handling operation is faster and easier than was previously possible. The present invention provides double the hay hauling capacity and requires fewer trips than previously known vehicles. In addition, the vehicle provides greater utility in that it is also adapted to be used for transporting livestock, thus eliminating need to purchase and maintain two separate limited use agricultural vehicles. It should be obvious that the livestock cage member may any type of cargo transporting device to lift and transport other loads other than livestock.

While this invention has been described fully and completely with special emphasis upon a preferred embodiment, it should be understood that within the scope of the appended claims the invention may be practiced otherwise than as specifically described herein.

I claim:

1. An agricultural vehicle for collecting and transporting hay bales at different levels, comprising
    a mobile wheeled frame for movement over the ground and having an open forward end, an open trailing end, and an open bottom,
    an upper lifting and supporting assembly having longitudinally extending lifting members movably mounted on opposite sides of said frame for vertical movement relative thereto,
    a lower lifting and supporting assembly having longitudinally extending lifting members movably mounted on opposite sides of said frame for vertical movement relative thereto,
    said upper and lower lifting and supporting assemblies each having an initial lower position adjacent to ground level and nested together in such lowered portion,
    means on said frame operatively connected to said upper and lower lifting and supporting assemblies for moving same vertically along said frame from said lower nested position to spaced raised load supporting positions independently or together, and
    means for connecting said frame to a prime mover for transporting said frame.

2. A vehicle according to claim 1 in which
    said frame comprises a plurality of longitudinally extending side members and a plurality of vertically and transversely extending members connected thereto,
    said upper lifting and supporting assembly being movably mounted on selected vertically extending frame members for vertical movement therealong from and to said lower nested position, and
    said lower lifting and supporting assembly being movably mounted on selected other vertically extending frame members for vertical movement therealong from and to said lower nested position.

3. A vehicle according to claim 2 further including
    a cargo carrying member cooperative with said upper and lower lifting and supporting assemblies of size and shape adapted to be lifted and transported thereby.

4. A vehicle according to claim 2 wherein
    said upper lifting and supporting assembly comprises a plurality of first vertical members movably mounted in longitudinally spaced and laterally opposed position on longitudinally alternating ones of said vertically extending frame members and each having a downwardly and inwardly inclined lower portion,
    first longitudinally extending and laterally opposed runner members fixed to the ends of said lower portions,
    said lower lifting and supporting assembly comprises a plurality of second vertical members movably mounted in longitudinally spaced and laterally opposed position on longitudinally alternating other ones of said vertically extending frame members and each having a downwardly and inwardly inclined lower portion,
    said second vertical members alternately positioned with respect to said first vertical members,
    second longitudinally extending and laterally opposed runner members fixed to the ends of said second assembly inclined lower portions, and
    said assembly moving means on said frame being operatively connected to said first and said second vertical members of said upper and lower lifting and supporting assemblies for moving same along said vertically extending frame members between said lower nested position and said spaced raised load supporting positions independently or together.

5. A vehicle according to claim 4 in which
    said assembly moving means on said frame comprises roller means attached to the upper ends of said first and second vertical members of said upper and lower lifting and supporting assemblies for moving said assemblies along said vertically extending frame members from said lower nested position to said spaced raised load supporting positions independently or together.

6. A vehicle according to claim 5 in which
    said assembly moving means comprises
    a plurality of first reels mounted on a first shaft extending longitudinally of said frame at the top thereof and cable means connected to said upper lifting and supporting assembly and operable to lift the same on rotation of said shaft, a plurality of second reels mounted on a second shaft extending longitudinally of said frame at the top thereof and cable means connected to said lower lifting and supporting assembly and operable to lift and same on rotation of said second shaft, and means for rotating said first and said second shafts for independently moving said upper and lower lifting and supporting assemblies.

7. A vehicle according to claim 2 in which
said vertical frame members comprise I-beams.

8. A vehicle according to claim 2 wherein
said vertical frame members comprise I-beams,
said upper lifting and supporting assembly comprises
a plurality of first vertical members movably mounted in longitudinally spaced and laterally opposed position on longitudinally alternating ones of said vertically extending I-beams and each having a downwardly and inwardly inclined lower portion,
first longitudinally extending and laterally opposed runner members fixed to the ends of said lower portions,
said lower lifting and supporting assembly comprises
a plurality of second vertical members movably mounted in longitudinally spaced and laterally opposed position on longitudinally alternating other ones of said vertically extending I-beams and each having a downwardly and inwardly inclined lower portion,
said second vertical members alternately positioned with respect to said first vertical members,
second longitudinally extending and laterally opposed runner members fixed to the ends of said second assembly inclined lower portions, and
said assembly moving means on said frame being operatively connected to said first and said second vertical members of said upper and lower lifting and supporting assemblies for moving same along said vertically extending I-beams between said lower nested position and said spaced raised load supporting positions independently or together.

9. A vehicle according to claim 8 in which
said assembly moving means on said frame comprises roller means attached to the upper ends of said first and said second vertical members of said upper and lower lifting and supporting assemblies on opposite sides of said I-beams and rolling on the web portion thereof for moving said assemblies along said vertically extending I-beams between said lower nested position and said spaced raised load supporting positions independently or together.

10. A vehicle according to claim 9 in which
said assembly moving means comprises
a plurality of first reels mounted on a first shaft extending longitudinally of said frame at the top thereof and cable means connected to said upper lifting and supporting assembly and operable to lift the same on rotation of said shaft,
a plurality of second reels mounted on a second shaft extending longitudinally of said frame at the top thereof and cable means connected to said lower lifting and supporting assembly and operable to lift the same on rotation of said second shaft, and
means for rotating said first and said second shafts for independently moving said upper and lower lifting and supporting assemblies.

11. A vehicle according to claim 1 in which
said means for connecting said frame to a prime mover comprises a pivotally connected goose-neck tongue member movable between a first position with said vehicle and said prime mover in longitudinal alignment and a second position with said vehicle parallel and laterally offset from said prime mover.

* * * * *